(12) United States Patent
Gomez et al.

(10) Patent No.: US 11,203,553 B2
(45) Date of Patent: Dec. 21, 2021

(54) SALT CERAMIC COMPOSITES AND MANUFACTURE THEREOF

(71) Applicant: THE PENN STATE RESEARCH FOUNDATION, University Park, PA (US)

(72) Inventors: Enrique Gomez, University Park, PA (US); Wonho Lee, University Park, PA (US)

(73) Assignee: THE PENN STATE RESEARCH FOUNDATION, University Park, PA (US)

(*) Notice: Subject to any disclaimer, the term of this patent is extended or adjusted under 35 U.S.C. 154(b) by 430 days.

(21) Appl. No.: 16/376,538

(22) Filed: Apr. 5, 2019

(65) Prior Publication Data

US 2019/0382317 A1    Dec. 19, 2019

Related U.S. Application Data

(60) Provisional application No. 62/684,308, filed on Jun. 13, 2018.

(51) Int. Cl.
| | |
|---|---|
| *C04B 35/515* | (2006.01) |
| *C04B 35/626* | (2006.01) |
| *H01M 10/056* | (2010.01) |
| *H01M 10/052* | (2010.01) |

(52) U.S. Cl.
CPC ........ *C04B 35/515* (2013.01); *C04B 35/6264* (2013.01); *H01M 10/052* (2013.01); *H01M 10/056* (2013.01); *C04B 2235/447* (2013.01); *C04B 2235/604* (2013.01); *C04B 2235/608* (2013.01); *H01M 2300/0091* (2013.01)

(58) Field of Classification Search
CPC . C04B 35/515; C04B 35/6264; H01M 10/056
See application file for complete search history.

(56) References Cited

U.S. PATENT DOCUMENTS

| 8,313,802 B2 | 11/2012 | Riman |
| 2017/0088471 A1 | 3/2017 | Randall |

FOREIGN PATENT DOCUMENTS

| CN | 107732295 A | 2/2018 |
| JP | 2010-113968 A2 | 5/2010 |
| JP | 2013-037992 A2 | 5/2013 |
| KR | 10-2017-0034581 A | 3/2017 |

(Continued)

OTHER PUBLICATIONS

Seih S. Berbano et al., "Cold sintering process of Li1.5Al0.5Ge1.5(PO4)3 solid electrolyte", J. Am. Ceram. Soc. 2017; 100:2123-2135.

(Continued)

*Primary Examiner* — Sarah A. Slifka
(74) *Attorney, Agent, or Firm* — Buchanan Ingersoll & Rooney PC (57) ABSTRACT

Highly dense lithium based ceramics can be prepared by a low temperature process including combining a lithium based ceramic with a polar solvent having a lithium based salt dissolved therein and applying pressure and heat to the combination to form a salt-ceramic composite. Advantageously, the lithium salt is one that dissolves in the polar solvent and the heat applied to the combination is no greater than about 250° C. Such composites can also have high ionic conductivity.

20 Claims, 4 Drawing Sheets

(56) References Cited

FOREIGN PATENT DOCUMENTS

WO 2018/007409 A1 1/2018

OTHER PUBLICATIONS

Jing Guo et al., "Cold Sintering: A Paradigm Shift for Processing and Integration of Ceramics", Angew. Chem. 2016, 128, 11629-11633.
Jing Guo et al., "Cold Sintering Process of Composites: Bridging the Processing Temperature Gap of Ceramic and Polymer Materials", Adv. Funct. Mater. 2016, 26, 7115-7121.
Jon-Paul Maria et al., "Cold sintering: Current status and prospects", J. Mater. Res., vol. 32, No. 17, Sep. 14, 2017, 3205-3218.
Joo-Hwan Seo et al., "Cold sintering approach to fabrication of high rate performance binderless LiFePo4 cathode with high volumetric capacity", Scripta Materialia 146 (2018) 267-271.

SALT CERAMIC COMPOSITES AND MANUFACTURE THEREOF

CROSS-REFERENCE TO RELATED APPLICATION

This application claims the benefit of U.S. Provisional Application No. 62/684,308 filed 13 Jun. 2018, the entire disclosure of which is hereby incorporated by reference herein.

STATEMENT REGARDING FEDERALLY SPONSORED RESEARCH

This invention was made with government support under Grant No. DE-AR0000766 awarded by the Department of Energy. The Government has certain rights in the invention.

TECHNICAL FIELD

The present disclosure is directed to preparing a dense composite made of a salt and a lithium based ceramic at low temperatures and pressures and the salt-ceramic composites themselves. Such salt-ceramic composites are useful as solid electrolytes, composite electrodes such as cathodes, and tough or responsive structural materials, for example.

BACKGROUND

Lithium metal-based secondary batteries, replacing the graphite electrode, are one of the ideal candidates for next generation energy storage system since they are able to increase 50% energy density compared graphite anode batteries. Development of Li metal batteries has been limited by safety concerns, short cycling capability, and low Columbic efficiency (CE) due to the lack of stable solid electrolyte interphase (SEI) and dendrite growth from Li metal.

Investigating ceramic ion conductors and integrating them into all solid state Li metal batteries (ASSLBs) are of great interest since they are non-flammable, have a large electrochemical window, have a wide range of operation temperature, and are able to stop dendrite growth from metal anodes. Among various solid electrolytes based on oxides, perovskites, NASICON materials, garnets, sulfides, and etc., NASICON based materials and garnet electrolytes have been highlighted as promising solid electrolytes since they have high ionic conductivity ($\sigma$, $\sim 10^{-4}$ S/cm) as well as chemical stability against water and air. However, a high-temperature sintering process ($\sim 1000°$ C.) is required to produce electrolytes having dense and high ionic conductivities. Such a sintering process causes several problems: lithium loss, impurity phase formation, preclusion of integration with organic materials to develop composite electrolytes, preclusion of integration in all-solid state batteries within composites cathodes, and high processing cost.

Recently, cold sintering process (CSP) has been developed to densify ceramic-based materials at low temperature (<200° C.) using a solvent (e.g., water) and pressure. See, U.S. Patent Application Publication No. 20170088471; WO 2018-007409 and Berbano, et al., *J. Am. Ceram. Soc.* 2017, 100, 2123. Berbano et al. successfully prepared an $Li_{1.6a}l_{0.5}Ge_{1.5}(PO_4)_3$ (LAGP) electrolyte with 80% relative density with a processing temperature of only 120° C. The temperature for preparing LAGP by Berbano was dramatically decreased compared to conventional sintering processes ($\sim 800°$ C.). They also showed that the low processing temperature of their CSP had a great advantage for integrating ceramic and polymer materials together. However, the cold sintered LAGP described in this reference had a low $\sigma$ of $3 \times 10^{-6}$ S/cm.

Hence, a continuing need exists for preparing solid electrolytes with high ion conductivities for use in rechargeable batteries.

SUMMARY OF THE DISCLOSURE

An advantage of the present disclosure is lithium salt-ceramic composites and processes for preparing same which are useful as solid electrolytes, composite electrodes, structural materials, etc. Such composites can advantageously have high ionic conductivity and high density but advantageously can be prepared at low temperatures.

These and other advantages are satisfied, at least in part, by a process of preparing a salt-ceramic composite which includes applying pressure and heat to a mixture to form a lithium salt-ceramic composite wherein the heat applied to the combination is no greater than about 250° C., e.g. no greater than about 200° C. The mixture includes a lithium based ceramic and a polar solvent having a lithium salt dissolved therein. The mixture can be prepared by combining a lithium based ceramic, a lithium salt with a polar solvent, such that the lithium salt dissolves in the polar solvent.

Embodiments include one or more of the following features, individually or combined. For example, the lithium based ceramic can comprise a lithium-aluminum phosphate or a lithium titanium phosphate; the lithium salt can comprise an organic or inorganic lithium salt or combinations thereof; the polar solvent can comprise an aqueous medium such as over 90 wt % water or the polar solvent can be other than water. In certain embodiments, the mixture includes less than about 50 wt %, e.g. less than about 30 wt %, of the polar solvent. In other embodiments, the lithium salt is in an amount greater than 4 volume % relative to the mixture.

Another aspect of the present disclosure includes a lithium based salt-ceramic composite. Such a composite can have a relative density of greater than 85% and/or ionic conductivity of greater than $10^{-4}$ S/cm.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein:

FIGS. 2a-2d are plots of relative density and ionic conductivity. FIG. 2a is a plot of cold sintered (CS) LAGP-LiTFSI and FIG. 2b is a plot of CS LATP-LiTFSI composite electrolytes with different LiTFSI contents. Temperature dependence of ionic conductivity for FIG. 2c, CS LAGP-LiTFSI, and FIG. 2d, CS LATP-LiTFSI, for comparison. Data from S LAGP and S LATP are also included.

FIGS. 5a and 5b are XRD patterns.

FIGS. 6a-6c are FTIR spectra of CS LAGP-LiTFSI (25 vol %), pure LiTFSI, and LiTFSI solution in DI water with different concentration. FIG. 6b shows SNS asymmetric stretch.

FIGS. 7a, 7b and 7c are plots showing performance of battery cells using salt-ceramic electrolytes prepared according to aspects of the present disclosure. FIG. 7b is a voltage profile of the Li plating/striping test at 0.2 mAh $cm^{-2}$.

DETAILED DESCRIPTION OF THE DISCLOSURE

Cold sintering of ceramic electrolytes requires the application of a small amount of solvent, high pressure, and modest temperatures to leverage a dissolution-precipitation process that reduces sintering temperatures to less than about 250° C. However, it is believed that such a process can lead to amorphous grain boundaries that are detrimental for high ionic conduction. We thus propose that the addition of a second phase in the ceramic, such as a Li salt, can reduce grain boundary resistances. We propose including this second phase in the ceramic by incorporating a soluble lithium salt in the solvent in a cold sintering process to form salt-ceramic composites.

Herein, we disclose simple, widely applicable procedures for fabricating salt-ceramic composites by a cold sintering process. To overcome prior limitation of cold sintering processes (e.g., poor Li ion transport through grain boundaries), we utilized a lithium salt that completely dissolves in a polar solvent to prepare the lithium based salt-ceramic composite. It is believed that by using the soluble lithium salt in the processes of the present invention, improvement in the interface of ceramic grains can be achieve resulting in improved density and ionic conductivity. For example, use of $Na_2Mo_2O_7$ instead of a lithium based ceramic, such as LAGP or LATP, in composites with lithium salts leads to ionic conductivities of $10^{-8}$ to $10^{-7}$ S/cm, making $Na_2Mo_2O_7$ materials not suitable as battery electrolytes. These results demonstrate the importance of using a lithium based ceramic that itself conducts ions in the composite formulation.

In an aspect of the present disclosure, salt ceramic composites can be prepared by applying pressure and heat to a mixture, which includes a lithium based ceramic and a polar solvent having a lithium salt dissolved therein. The mixture can be prepared by combining a lithium based ceramic with a polar solvent and a lithium salt dissolved in the polar solvent. Advantageously, the lithium salt used in the process is completely soluble in the polar solvent under the process conditions, e.g., at the concentrations, temperature and pressure used to form the salt-ceramic composite. In contrast, the lithium based ceramic has limited solubility in the polar solvent under the process conditions, e.g., at the concentrations, temperature and pressure used to form the salt-ceramic composite.

In practicing certain aspects of the processes of the present disclosure, it was found that a relatively small amount of the polar solvent is needed to form a relatively dense and highly conductive salt-ceramic composite. For example, the mixture can be prepared by combining a lithium based ceramic with a polar solvent having the salt dissolved therein in which the polar solvent is in an amount of less than 50 wt % of the mixture, e.g., no more than about 30 wt %, 20 wt %, 15 wt % and 10 wt % of the total weight of the mixture. Further, the lithium salt is an amount of at least about 4 volume % of the ceramic, e.g., at least about 5 vol %, 10 vol %, 15 vol %, and higher such as at least about 20 vol %.

Another advantage of the process of the present disclosure is the use of low temperatures and pressures. For example, salt ceramic composites can be prepared by applying heat to the mixture to form the composite of no greater than about 250° C. In certain embodiments, the temperature is no greater than about 200° C., such as no greater than about 150° C. In certain embodiments, the pressure applied to the mixture is not hydrostatic since a small amount of a polar solvent is used in the mixture, but uniaxial. Such uniaxial pressure can be applied with heat to the mixture of no greater than about 1,000 MPa, e.g., no greater than about 750 MPA, such as no greater than about 500 MPa. Preferably, however, the temperature is at least about 120° C. and the pressure is at least about 200 MPa.

Another aspect of the present disclosure includes a lithium based salt-ceramic composite which can be prepared to have a relative density of greater than 85% and/or ionic conductivity of greater than $10^{-4}$ S/cm. It is believed that the processes of the present disclosure can result in an increased amount of a lithium composition at grain boundaries of the lithium based ceramic due to the lithium salt.

Lithium based ceramics that can be used in the present disclosure include, for example, lithium aluminum germanium phosphates, lithium aluminum titanium phosphates, lithium lanthanum zirconates and combinations thereof. Lithium salts that can be used in the present disclosure include, for example, one or more organic lithium salts such as a sulfonimide lithium salt, e.g., a bis(trifluoromethane) sulfonimide lithium salt or a bis(fluorosulfonyl)imide lithium salt or combinations thereof. Inorganic lithium salts are also useful in practicing the processes of the present disclosure and include, without limitation, lithium dihydrogenphosphate, lithium sulfates, lithium nitrates, lithium halides such as lithium chloride or lithium bromide, etc. and combinations thereof.

Polar solvents that can be used in the present disclosure include, for example, water, or a mixture of water with another polar solvent such as an aqueous medium having over 90 wt % water; also protic or aprotic polar solvents can be used such as lower alcohols, e.g., methanol, ethanol, propanol, isopropanol, or acetic acid, acetone, dimethyl sulfoxide, acetonitrile and combinations thereof.

To show the versatility of the processes of the present disclosure, we chose a bis(trifluoromethane)sulfonimide lithium salt (LiTFSI) dissolved in DI water as a liquid phase to sinter two NASICON-type ceramics of $Li_{1.6}Al_{0.5}Ge_{1.5}(PO_4)_3$ (LAGP) and $Li_{1.5}Al_{0.4}Ti_{1.6}(PO_4)_3$ (LATP) to produce cold sintered (CS) LAGP-LiTFSI and CS LATP-LiTFSI composites which are useful as electrolytes.

Interestingly, by controlling the concentration of LiTFSI solution, high σ values on the order of $10^{-4}$ S/cm or greater were achieved for both CS LAGP-LiTFSI and CS LATP-LiTFSI at significantly low processing temperature, e.g., less than about 130° C., while preserving high relative densities, e.g., greater than about 85%, such as about 88%. The obtained σ values were almost identical with conventionally sintered LAGP and LATP (S LAGP and S LATP) that were sintered above 800° C. We also demonstrate that CS LAGP-LiTFSI can be cycled in Li symmetric cells over 1800 h at 0.2 mAh cm$^{-2}$. The salt-ceramic composites prepared according to the present disclosure can be used in a variety of fields, including solid electrolytes, composite cathodes, and tough or responsive structural materials.

Figure 1:
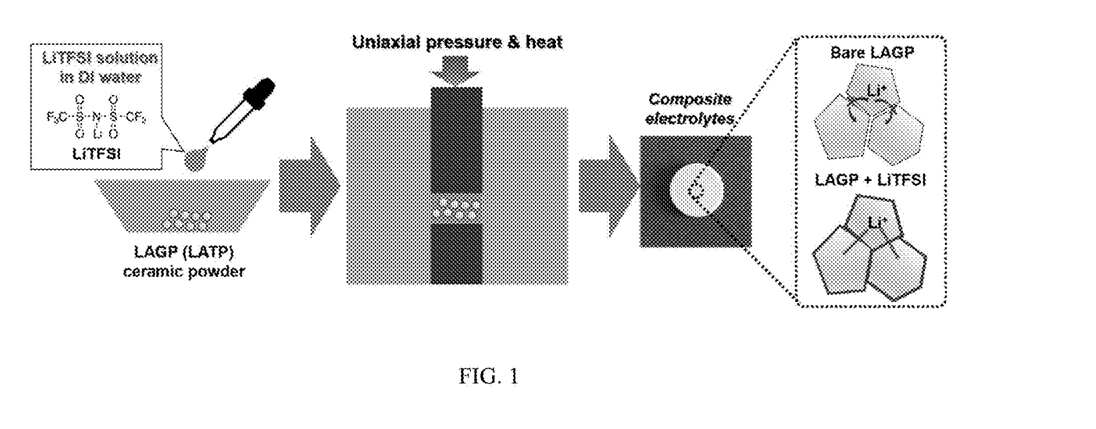
FIG. 1 is a schematic illustration of a cold sintering process according to an aspect of the present disclosure used to produce composite electrolytes comprised of ceramics and organic Li salts. Processing temperature was about 130° C.

We selected bis(trifluoromethane)sulfonimide lithium salt (LiTFSI) to fabricate salt-ceramic composite electrolytes through cold sinter process (CSP) since LiTFSI is highly soluble in water and stable against hydrolysis and has a high decomposition temperature above 300° C. We believe that fabricating salt-ceramic composites according to the present disclosure can advantageously compensate for high grain boundary resistance as seen with other cold sintered ceramic electrolytes. In one aspect of the present disclosure, we prepared salt-ceramic composite electrolytes by cold sintering LAGP or LATP powder using a LiTFSI solution in DI water with different LiTFSI concentration under uniaxial pressure as shown in FIG. 1, producing CS LAGP-LiTFSI and CS LATP-LiTFSI. In order to examine the effect of LiTFSI contents on Li ion transport behavior and sinterability, we varied volume fractions of LiTFSI relative to LAGP and LATP in the range of 0-21 vol %. Details for preparing composite electrolytes are described in the experimental section.

Figures 2A, 2D:
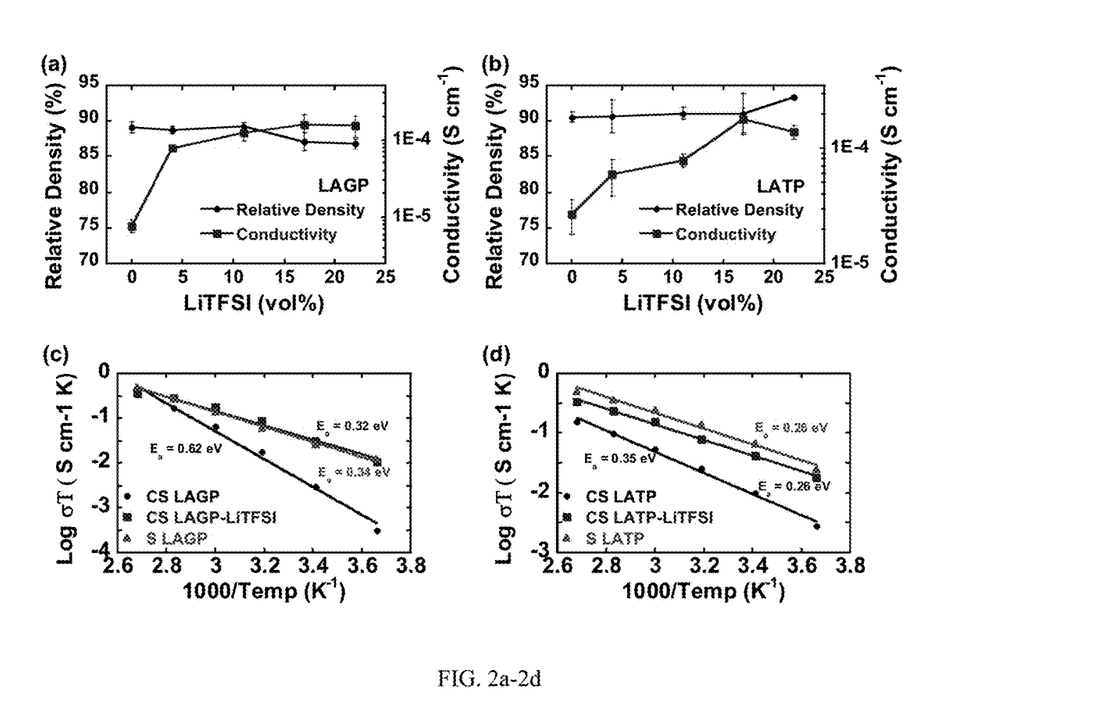

FIG. 2a and Table 1 present relative density and total σ values of CS LAGP-LiTFSI containing different vol % LiTFSI. σ values were obtained from impedance spectra of symmetric cells (Au/electrolyte/Au) at room temperature.

TABLE 1

Summary of relative density and ionic conductivity values of LAGP and LATP with different LiTFSI contents.

| Process | LiTFSI (vol %) | Relative Density[e] (%) | Conductivity (S/cm) | Maximum Conductivity (S/cm) |
|---|---|---|---|---|
| Cold Sintered LAGP[a] | 0% | 89.1 ± 0.7 | $7.6 \times 10^{-6} \pm 1.4 \times 10^{-6}$ | $9.5 \times 10^{-6}$ |
| | 4% | 88.8 ± 0.5 | $7.7 \times 10^{-5} \pm 6.2 \times 10^{-6}$ | $8.5 \times 10^{-5}$ |
| | 11% | 88.9 ± 0.4 | $1.2 \times 10^{-4} \pm 2.5 \times 10^{-5}$ | $1.6 \times 10^{-4}$ |
| | 17% | 87.1 ± 1.3 | $1.6 \times 10^{-4} \pm 5.3 \times 10^{-5}$ | $2.3 \times 10^{-4}$ |
| | 22% | 86.8 ± 0.7 | $1.8 \times 10^{-4} \pm 4.3 \times 10^{-5}$ | $2.2 \times 10^{-4}$ |
| Conventionally Sintered LAGP[b] | — | 87.5 ± 0.5 | $1.0 \times 10^{-4} \pm 1.9 \times 10^{-6}$ | $1.0 \times 10^{-4}$ |
| Cold Sintered LATP[c] | 0% | 90.6 ± 0.7 | $2.7 \times 10^{-5} \pm 8.9 \times 10^{-6}$ | $4.0 \times 10^{-5}$ |
| | 4% | 90.7 ± 2.3 | $5.9 \times 10^{-5} \pm 2.1 \times 10^{-5}$ | $8.1 \times 10^{-5}$ |
| | 11% | 91.1 ± 0.8 | $7.8 \times 10^{-5} \pm 1.0 \times 10^{-5}$ | $9.0 \times 10^{-5}$ |
| | 17% | 91.1 ± 2.7 | $1.8 \times 10^{-4} \pm 4.7 \times 10^{-5}$ | $2.3 \times 10^{-4}$ |
| | 22% | 93.4 ± 0.2 | $1.4 \times 10^{-4} \pm 1.9 \times 10^{-5}$ | $1.6 \times 10^{-4}$ |
| Conventionally Sintered LATP[d] | — | — | $2.5 \times 10^{-4}$ | — |

[a]Pressure: 380 MPa, Temp: 130° C., Time: 2 hr;
[b]Temp: 825° C., Time: 10 hr;
[c]Pressure: 620 MPa, Temp: 130° C., Time: 2 hr;
[e]Calculated with the theoretical density of LAGP and bulk density of LATP (LICGC ™ SP-01 from Ohara Company).
[d]Obtained from LICGC ™ SP-01 electrolyte from Ohara Company Interestingly, adding a small amount of LiTFSI (4.0 vol %) significantly increased σ of CS LAGP, leading to an order of magnitude increase of σ from $7.6\times10^{-6}$ (CS LAGP) to $7.7\times10^{-5}$ (CS LAGP-LiTFSI 4.0 vol %) S/cm (FIG. 2a and Table 1). Further increase of LiTFSI gradually enhanced σ, and the maximum value of $2.3\times10^{-4}$ S/cm was achieved from 17 vol % LiTFSI. Relative density was comparable (87-89%) in all ranges of LiTFSI contents, indicating that LiTFSI did not have an adverse effect on densification process during CSP. The Young's modulus (E) of cold sintered electrolytes was measured through nanoindentation. The modulus, E, of CS LAGP was 200 GPa, near that of other reported values for ceramic electrolytes, while that of CS LAGP-LiTFSI was 140 GPa. Moduli of both CS LAGP and CS LAGP-LiTFSI are significantly higher than Li metal, suggesting the potential to stop dendrite growth in lithium cells.

We also show cold sintering of ceramic-salt composite electrolytes using another NASICON-type electrolyte, LATP. The LATP powder used was a glass-ceramic ($Li_{1+x+y}Al_xTi_{2-x}Si_yP_{3-y}O_{12}$, Ohara), which has higher ionic conductivities and better mechanical properties than that of pure LATP (see experimental section). As shown in FIG. 2b, the same trend was observed; high σ was obtained from 17 vol % LiTFSI in CS LATP-LiTFSI composite electrolyte.

We note that σ values ($\sim10^{-4}$ order) obtained from 17 vol % LiTFSI in CS LAGP-LiTFSI and CS LATP-LiTFSI composite electrolytes are almost comparable with the values of conventionally sintered LAGP and LATP (S LAGP and S LATP), respectively (Table 1). Although LiTFSI significantly enhances ionic conductivities, ion transport through the ceramic phase is important; replacing the ceramic ion conductor with an insulator $Na_2Mo_2O_7$ leads to poor ionic conductivities of $10^{-7}$ S cm$^{-1}$, even with excess amount of LiTFSI (30 vol %).

We measured the temperature dependence of CS LAGP, CS LAGP-LiTFSI (17 vol % LiTFSI), and S LAGP in the range of 0~100° C. As shown in FIGS. 2c and 2d, all of the electrolytes exhibited the typical Arrhenius behavior and the linear values fitted to the Arrhenius equation (eq. 1).

$$\sigma = A\exp\left(-\frac{E_a}{kT}\right)$$

where A is the pre-exponential factor, $E_a$ is the activation energy, k is the Boltzmann constant, and T is the absolute temperature. The calculated $E_a$ value from S LAGP was 0.31 eV, which is similar with previous studies. CS LAGP-LiTFSI had much lower $E_a$ (0.29 eV) than that of LAGP (0.59 eV) and was comparable with S LAGP; those values are well correlated with the trend in σ. This result indicated that LiTFSI greatly reduced grain boundary resistance of LAGP. LATP also showed similar trends: CS LATP-LiTFSI showed low $E_a$ (0.22 eV) that is much lower than that of CS LATP and similar with S LATP. From these results, preparing salt-ceramic composite electrolytes through CSP is efficient strategy to obtain densified electrolytes with high ionic conductivity using low processing temperatures.

Figure 3:
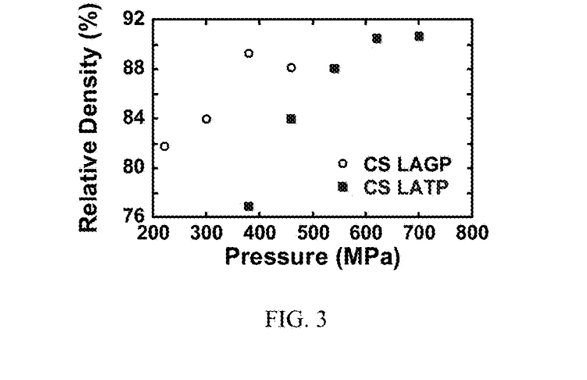
FIG. 3 is a plot showing relative density of CS LAGP and CS LATP prepared under different pressure at 130° C. for 2 hr.

The cold sintering conditions can be varied by varying the uniaxial pressure to obtain densified electrolytes. We found that relative densities of CS LAGP and CS LATP gradually increase with increasing pressures, where CS LAGP and CS LATP show the highest relative densities under 380 MPa and 620 MPa at 130° C., respectively (FIG. 3).

Figures 4A, 4B:
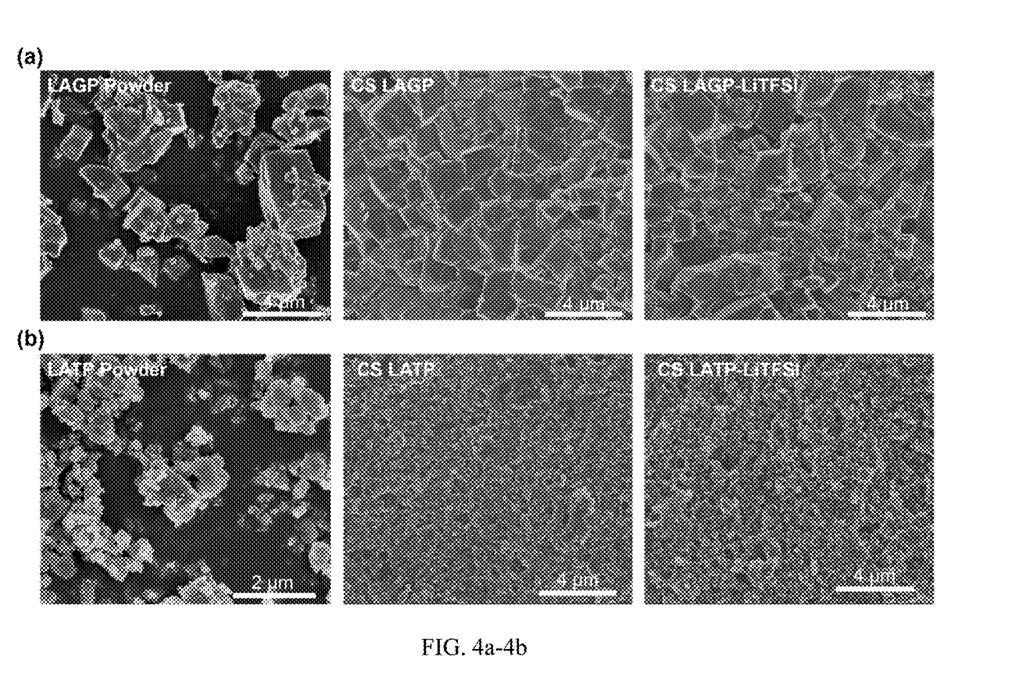
FIGS. 4a and 4b are SEM images of fracture surfaces of (a) LAGP and (b) LATP composite electrolytes. In case of CS LAGP-LiTFSI and CS LATP-LiTFSI, 17 vol % LiTFSI was incorporated.

As discussed before, high relative densities at low processing temperature were successfully achieved in both CS LAGP-LiTFSI and CS LATP-LiTFSI. To clearly observe a densified microstructure of salt-ceramic composite electrolytes, SEM images of LAGP powder and the fractures surface of the CS LAGP and CS LAGP-LiTFSI were taken as shown in FIG. 4a. Cold sintering of LAGP powder clearly produced densely packed microstructures without any noticeable porous structure. In addition, no grain growth took place, which is similar behavior with previous report for CSP. Interestingly, CS LAGP-LiTFSI showed nearly identical microstructures with CS LAGP electrolyte. Densely packed microstructures through CSP was confirmed again in CS LAGP-LiTFSI system in FIG. 4b.

Figures 5A, 5B:
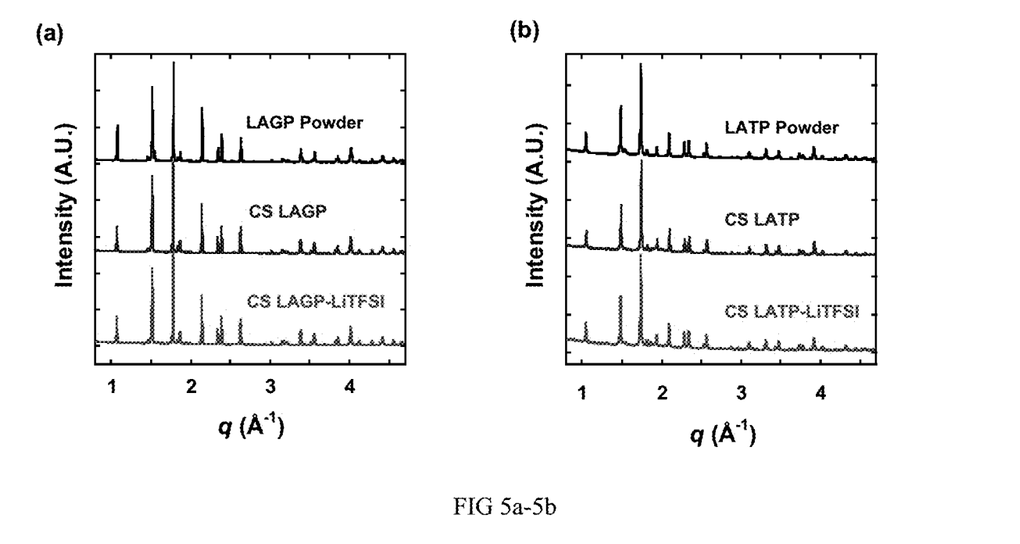
FIG. 5a is an XRD pattern for LAGP and FIG. 5b is an XRD pattern for LATP composite electrolytes. In case of CS LAGP-LiTFSI and CS LATP-LiTFSI, 17 vol % LiTFSI was incorporated.

To explore how cold sintering process and the addition of LiTFSI affects crystal structures of LAGP (and LATP), we performed XRD (FIG. 4). XRD patterns of LAGP powder, CS LAGP, and CS LAGP-LiTFSI are shown in FIG. 5a. The main phase of LAGP powder was identified as NASICON-type hexagonal crystal structures, $Li[Ge(PO_4)_3]$. Two impurity phases of $GeO_2$ (q~1.84 Å$^{-1}$) and $AlPO_4$ (q~1.87 Å$^{-1}$) were also found, but in negligible amounts. Unit cell parameters of hexagonal structures and amount of impurity phases are summarized in Table 2.

TABLE 2

Unit cell parameters and amount of impurity phases.

| Process | $a_{hex}$ (Å$^{-1}$)[b] | $c_{hex}$ (Å$^{-1}$)[b] | $AlPO_4$ (wt %)[b] | $GeO_2$ (wt %)[b] | $TiO_2$ (wt %)[b] |
|---|---|---|---|---|---|
| LAGP Powder | 8.279 | 20.500 | 5.3 | 1.6 | — |
| CS LAGP | 8.282 | 20.488 | 6.2 | 1.1 | — |
| CS LAGP-LiTFSI[a] | 8.283 | 20.480 | 8.4 | 1.6 | — |
| LATP Powder | 8.497 | 20.804 | — | — | 5.1 |
| CS LATP | 8.499 | 20.807 | 1.0 | — | 6.2 |
| CS LATP-LiTFSI[a] | 8.499 | 20.799 | 2.3 | — | 5.7 |

[a]17 vol % LiTFSI was incorporated.
[b]analyzed using MDI JADE 2010 software.

Notably, CSP by using LiTFSI solution in DI water preserved the hexagonal structures of LAGP; no additional peak was observed after cold sintering of LAGP powder, and the unit cell parameters for LAGP powder, CS LAGP, and CS LAGP-LiTFSI were not significantly altered (Table 2). And also, the amount of impurity phases of $GeO_2$ and $AlPO_4$ were almost identical with pristine powder. Cold sintering of LATP also exhibited the same result: the NASICON-type hexagonal crystal structures were preserved and no increase in the amount of impurity phase ($TiO_2$, q~1.94 Å$^{-1}$) after cold sintering of LATP powder is observed. Taken together, these experiments support the conclusion that cold sintering of ceramic powder and organic salts at low temperature (~130° C.) could be an excellent methodology for obtaining highly dense composites that incorporates both merits of materials.

Next, to investigate how LiTFSI increased the ionic conductivity of ceramic electrolytes, we measured FT-IR of CS LAGP and CS LAGP-LiTFSI. Both CS LAGP and CS LAGP-LiTFSI exhibited predominant absorption bands in the 900-1300 cm$^{-1}$ region that corresponds to $(PO_4)_3$ ionic group resonances of LAGP. Distinguishable absorption bands in CS LAGP-LiTFSI were observed at 720~820, ~1200, and 1300~1400 cm$^{-1}$ peaks. These corresponds to the characteristic peaks of LiTFSI.

Figures 6A, 6C:
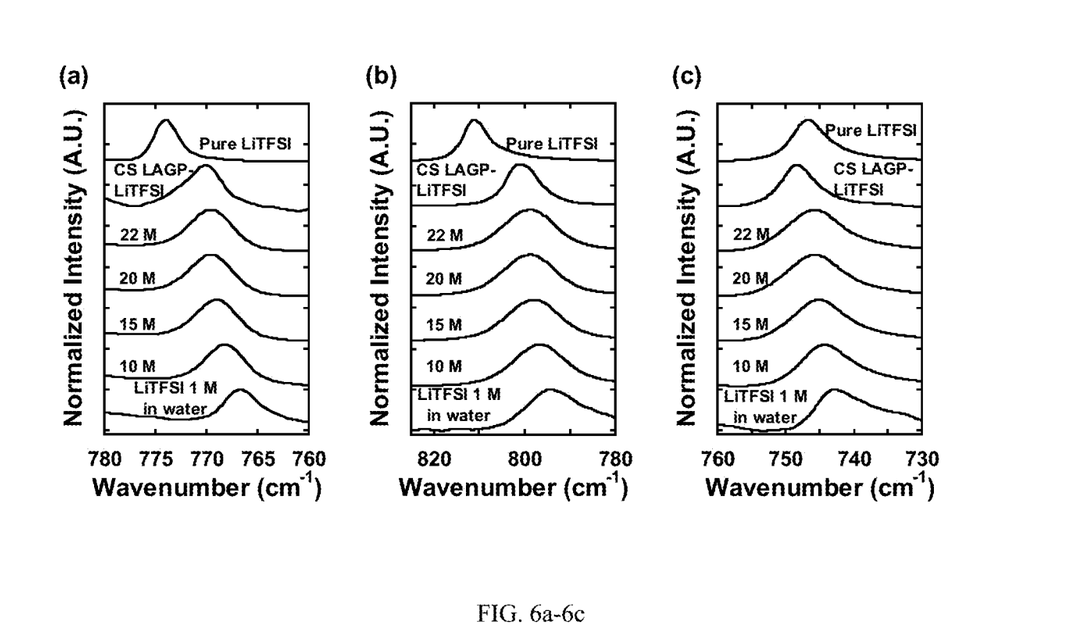
FIG. 6a shows SNS symmetric stretch.
FIG. 6c shows symmetric deformation of $CF_3$ from LiTFSI.

We performed FT-IR of pure LiTFSI and LiTFSI solution in DI water by varying concentration from 1 M (dilute solution) to 22 M (saturated solution) to explore the chemical environment of LiTFSI in CS LAGP-LiTFSI. FIG. 5 compares the peak shift of the symmetric stretch of SNS (FIG. 6a), the asymmetric stretch of SNS (FIG. 6b), and symmetric deformation of $CF_3$ groups (FIG. 6c). Upon dissolving LiTFSI in DI water (1 M concentration), the SNS peak at 774 $cm^{-1}$ from pure LiTFSI was significantly shifted to 767 $cm^{-1}$. This is because $TFSI^-$ is solvated by water, leading to hydrogen bonding. As the concentration of LiTFSI in water increases, the peak was shifted to a higher wavenumber, but saturates at the 20 M concentration, most likely due to the formation of contact ion pairs from the $Li^+$ and the $TFSI^-$ in highly concentrated solutions.[26,27] Interestingly, the SNS peak of CS LAGP-LiTFSI is close to 20 M LiTFSI in water, but slightly more shifted toward pure LiTFSI. The same behavior was observed in the asymmetric stretch of SNS and symmetric deformation of $CF_3$ (FIGS. 6b and 6c); $CF_3$ peak in CS LAGP-LiTFSI is more shifted to a higher wavenumber than that of pure LiTFSI because the LAGP restricts the movement of the $Li^+$, forming a stronger contact ion pair. The result of FT-IR suggests that LiTFSI in CS LAGP-LiTFSI exists along the grain boundary of LAGP as $Li^+$ and $TFSI^-$ contact ion pairs form along with a small amount of water molecules, which are present from the residual solvent used in the cold sintering process. This is similar to the "water-in-salt" electrolyte system developed by Wang and Xu groups. They found out that "water-in-salt" electrolytes, highly concentrated salt solution in water, enabled stable and high-voltage lithium-ion batteries due to intimate $Li^+$-$TFSI^-$ interactions and the scarcity of free water molecules. In our system, we believe that LiTFSI is located along grain boundaries in salt-ceramic composite electrolytes, and in these regions the salt resembles a "water-in-salt" system due to residual cold sintering solvent, which helps Li ion transport through grain boundaries.

Finally, the electrochemical performance of CS LAGP-LiTFSI was tested using Li/CS LAGP-LiTFSI/Li symmetric cells. In accordance with previous reports, a large total resistance was observed due to high interfacial resistance between Li metal and CS LAGP-LiTFSI. To reduce interfacial resistance, we added a small amount of liquid electrolytes of 4 M LiFSI in DME at the electrolyte surfaces (~5.0 $uL/cm^2$); DME is known for enabling stable lithium plating/stripping with high Coulombic efficiency.

Figures 7A, 7C:
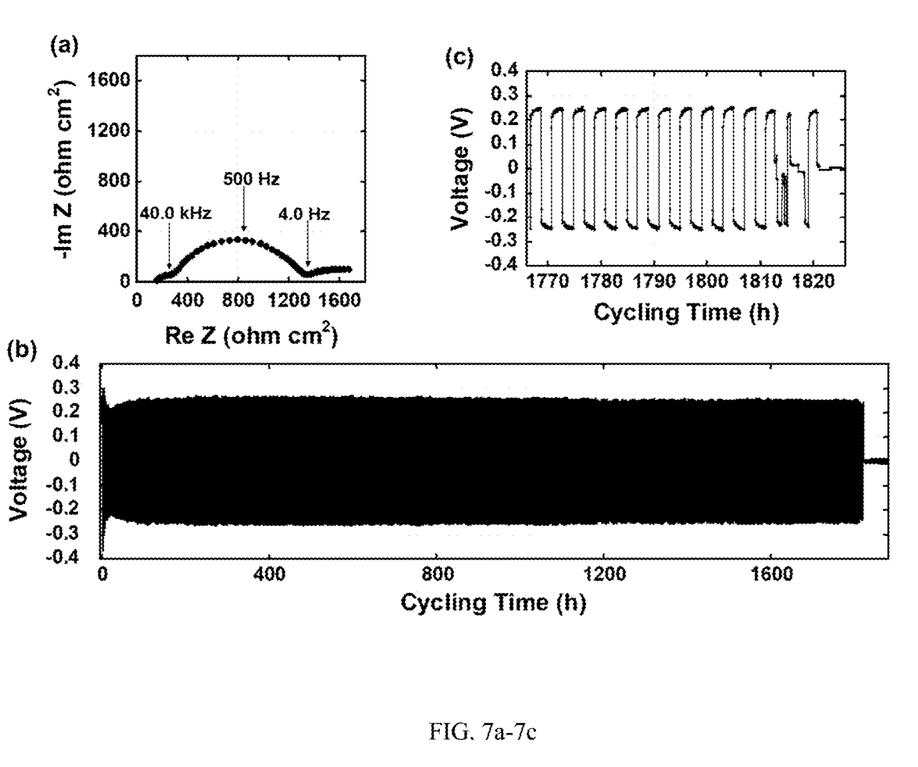
FIG. 7a Nyquist plot plot for Li/CS LAGP-LiTFSI (17 vol %)/Li symmetric cells.
FIG. 7c shows the last few cycles of Li plating/striping test.

As shown in FIG. 7a, total resistances were dramatically reduced from about 7500 to 1300 ohm $cm^2$ with the addition of liquid electrolyte, from an increase in the effective contact area and from reduction of unwanted interfacial reactions. Two semicircles were observed in the Nyquist plot of symmetric cells, where a semicircle in the medium-frequency range can be attributed to Li ion conduction at grain boundaries and another at low frequency is due to interfacial resistances (FIG. 7a).

FIG. 7b displays plating-stripping tests of symmetric cells at 0.2 mAh $cm^{-2}$ (0.1 mA $cm^{-2}$ for 2 hr), and the last cycles are presented in FIG. 7c. The voltage profiles exhibited stable cycling over 1800 h without any voltage drop or signatures of Li dendrite growth. The voltage profile becomes unstable around 1810 h, followed by a sudden drop of the voltage to 0 V at 1821 h due to short-circuiting (FIG. 7c). Nevertheless, our ceramic-salt electrolytes demonstrate the stability needed for incorporation in all-solid-state Li metal batteries.

To further show the versatility of the processes of the present disclosure, we used different lithium salts to prepare cold sintered lithium based ceramics as shown in Table 3 below.

TABLE 3

Relative density and ionic conductivity of salt-ceramic electrolytes using various salts.

| Salt | Amount | Relative Density (%) | Conductivity (s/cm) |
|---|---|---|---|
| — | — | 90.6 | $2.7 \times 10^{-5}$ |
| LiTFSI | 2.0 wt % | 90.7 | $5.9 \times 10^{-5}$ |
|  | 5.7 wt % | 91.1 | $7.8 \times 10^{-5}$ |
|  | 9.1 wt % | 91.1 | $1.8 \times 10^{-4}$ |
| $LiH_2PO_4$ | 2.0 wt % | 92.0 | $6.9 \times 10^{-5}$ |
|  | 5.7 wt % | 92.9 | $1.3 \times 10^{-5}$ |
|  | 9.1 wt % | 87.8 | $1.5 \times 10^{-5}$ |
| $Li_2SO_4$ | 2.0 wt % | 93.8 | $4.8 \times 10^{-5}$ |
|  | 5.7 wt % | 97.0 | $9.7 \times 10^{-5}$ |
|  | 9.1 wt % | 94.6 | $7.0 \times 10^{-5}$ |
| $LiNO_3$ | 2.0 wt % | 80.0 | $3.6 \times 10^{-5}$ |
|  | 5.7 wt % | 91.1 | $7.9 \times 10^{-4}$ |
|  | 9.1 wt % | 88.6 | $9.2 \times 10^{-4}$ |
| LiCl | 2.0 wt % | 77.7 | $2.9 \times 10^{-5}$ |
|  | 5.7 wt % | 88.1 | $3.0 \times 10^{-4}$ |
|  | 9.1 wt % | 86.8 | $1.1 \times 10^{-3}$ |

The salt-ceramic composites were prepared through the cold sintering process using LATP powder with different lithium salt solution in DI water such as $LiH_2PO_4$, $Li_2SO_4$, $LiNO_3$, and LiCl. All of the processes were done at 130° C. with uniaxial pressure of 620 MPa.

As shown by Table 3 above, the process of the present disclosure can prepare highly dense composites with high ionic conductivity. For example, CS LATP-$Li_2SO_4$ significantly increased the relative density compared to bare LATP (90.6%→97.0%). In addition, for LiCl and $LiNO_3$, they greatly improved ionic conductivities, achieving values on the order of $10^{-3}$ S/cm.

EXAMPLES

The following examples are intended to further illustrate certain preferred embodiments of the invention and are not limiting in nature. Those skilled in the art will recognize, or be able to ascertain, using no more than routine experimentation, numerous equivalents to the specific substances and procedures described herein.

Materials:

LAGP powder with a volume mean diameter of particles $M_v$ of 26.13 μm and LATP powder with $M_v$ of 1.15 μm were purchased from Toshima Manufacturing Co. and Ohara Co., respectively. LATP films (LIC-GC, LATP/$SiO_2$, 19 mm diameter×160 μm thickness) were purchased from Ohara Co. LiTFSI and bis(fluorosulfonyl)imide lithium salt (LiFSI) were purchased from Sigma Aldrich and TCI America, respectively. Lithium chip (16 mm diameter×250 μm thickness) was purchased from MTI Corporation. All of the materials were used without further purification.

Methods:

Preparation of Salt-Ceramic Composite Electrolytes from CSP.

10 wt % of deionized (DI) water was added to LAGP powder and homogeneously mixed in a mortar and pestle. For CS LAGP-LiTFSI, LiTFSI was first dissolved in DI water at 0.63~3.5 M concentration, and the solution was then mixed with LAGP powder. The moistened powder was placed in a pellet die to apply 380 MPa of uniaxial pressure at 130° C. for 2 hr using a Carver press. To maintain a uniform temperature, the press plates were heated and the pellet die was covered by a band heater. The pressed pellets were then polished by 400, 800, and 2500 grit, which led to uniform and mirror-like surfaces. For the preparation of CS LATP-LiTFSI, all processes were the same, except that 20 wt % DI water was mixed with powders and 620 MPa uniaxial pressure was applied. For comparison, S LAGP was also prepared by heating LAGP powder at 825° C. for 10 hr in a furnace.

Characterization. Relative densities of electrolytes of CS LAGP-LiTFSI and CS LATP-LiTFSI were calculated by taking the ratio of measured densities to theoretical density of LAGP and bulk density of Ohara LATP films, respectively.[22] Experimental densities were obtained by measuring weight and volume. σ values were extracted from impedance spectra measured using a Solartron Ametek Modulab with an AC amplitude of 10 mV in the range of $10^{-1} \sim 10^{6}$ Hz. As electrodes, 100 nm Au was sputtered on both sides of ceramic or composite pellets. Measurements were performed from 0 to 100° C. Microstructures of fracture surfaces of electrolytes were obtained by field emission scanning electron microscope (FESEM, NanoSEM 630). Crystal structures and phase purity were determined by X-ray diffraction (PANalytical Empyrean XRD system) with Cu—Kα radiation in the 2 theta range of 10~70°. The crystal structures and weight percentage of impurity phase were analyzed using MDI JADE 2010 software. FTIR spectra were obtained using a Bruker Vertex 70 FTIR spectrometer (Bruker, Billerica, Mass.) with a mercury cadmium telluride detector. The spectra were collected with a ZnSe crystal at a spectral resolution of 2 $cm^{-1}$ and 500 scans. The symmetric coin cells of Li/CS LAGP-LiTFSI/Li were assembled in an argon-filled glovebox. To reduce the resistance of solid-solid interface, 4 M LiFSI solution in 1,2-dimethoxyethane (DME) (5.0 μL/$cm^{2}$) was added in between Li metal and electrolytes. The galvanostatic $Li^{+}$ charge and discharge measurements of Li/LAGP-LiTFSI/Li cells were measured by using Neware Battery Testing System BTS3000 at room temperature.

Preparing a salt-ceramic composite such as LAGP-LiTFSI and LATP-LiTFSI composites by applying pressure and heat to a mixture, which mixture includes a lithium based ceramic and a polar solvent having a lithium salt dissolved therein in such composites exhibiting high relative densities of approximately 90% and ionic conductivities in excess of $10^{-4}$ S $cm^{-1}$ at 20° C. The relative densities and ionic conductivities of composites prepared according to aspects of the present disclosure are comparable with the values obtained from LAGP and LATP sintered above 800° C. The results further show that cold sintered LAGP-LiTFSI is electrolchemically stable in Li symmetric cells over 1800 h at 0.2 mAh $cm^{-2}$. Cold sintering provides a new approach for bridging the gap in processing temperatures of different materials, thereby enabling high-performance composites for electrochemical systems.

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. A process of preparing a salt-ceramic composite, the process comprising:

applying pressure and heat to a mixture including a lithium based ceramic and a polar solvent having a lithium salt dissolved therein, to form a salt-ceramic composite, wherein the heat applied to the mixture is no greater than about 250° C.

2. The process of claim 1, wherein the lithium based ceramic comprises a lithium-aluminum phosphate or a lithium titanium phosphate.

3. The process of claim 1, wherein the lithium salt comprises an organic lithium salt.

4. The process of claim 1, wherein the polar solvent comprises an aqueous medium having over 90 wt % water.

5. The process of claim 1, wherein the heat applied to the mixture is no greater than about 150° C.

6. The process of claim 1, wherein the pressure applied to the mixture is a uniaxial pressure of no greater than about 1,000 MPa.

7. The process of claim 1, wherein the mixture includes less than about 50 wt % of the polar solvent.

8. The process of claim 1, wherein the lithium salt is in an amount greater than 4 volume % relative to the mixture.

9. A salt-ceramic composite prepared according to claim 1.

10. The salt-ceramic composite of claim 9 having a relative density of greater than 85%.

11. The salt-ceramic composite of claim 9 having an ionic conductivity of greater than $10^{-4}$ S/cm.

12. The salt-ceramic composite of claim 9, where the lithium salt increases an amount of a lithium composition at grain boundaries of the lithium based ceramic.

13. The process of claim 1, wherein the polar solvent of the mixture has the lithium salt completely dissolved therein.

14. The process of claim 13, wherein the lithium based ceramic has a limited solubility in the polar solvent such that the lithium based ceramic is not completely dissolvable in the polar solvent.

15. The process of claim 13, wherein the lithium based ceramic has a solubility in the polar solvent under the pressure and a temperature at which the applying of the pressure and heat occurs that is below a solubility of the lithium salt.

16. The process of claim 1, wherein the polar solvent of the mixture has the lithium salt completely dissolved therein and the method comprising:

mixing the lithium based ceramic with the polar solvent having the lithium salt completely dissolved therein to moisten the lithium based ceramic, the lithium based ceramic being in powder form or particulate form, the mixing of the lithium based ceramic with the polar solvent having the lithium salt completely dissolved therein occurring before the applying of the pressure and the heat.

17. The process of claim 16, wherein the polar solvent comprises water.

18. The process of claim 16, wherein the mixture includes the polar solvent at a composition that is less than 50 weight percent of the mixture or is less than 30 weight percent of the mixture.

19. The process of claim 18, wherein the mixture includes the lithium salt at a composition that is greater than 4 volume percent of the mixture.

20. The process of claim 18, wherein the lithium salt is a bis(trifluoromethane)sulfonimide lithium salt (LiTFSI) salt and the lithium based ceramic is $Li_{1.6a}l_{0.5}Ge_{1.5}(PO_4)_3$ (LAGP) or $Li_{1.5a}l_{0.4}Ti_{1.6}(PO_4)_3$ (LATP).

* * * * *